United States Patent
Mountney

(10) Patent No.: US 12,514,509 B2
(45) Date of Patent: Jan. 6, 2026

(54) PARALLEL ADAPTIVE MOTION ARTIFACT REMOVAL

(71) Applicant: Rajant Health Incorporated, Malvern, PA (US)

(72) Inventor: Jack Mountney, Malvern, PA (US)

(73) Assignee: Rajant Health Incorporated, Malvern, PA (US)

( * ) Notice: Subject to any disclaimer, the term of this patent is extended or adjusted under 35 U.S.C. 154(b) by 263 days.

(21) Appl. No.: 18/171,180

(22) Filed: Feb. 17, 2023

(65) Prior Publication Data

US 2023/0263474 A1 Aug. 24, 2023

Related U.S. Application Data

(60) Provisional application No. 63/311,726, filed on Feb. 18, 2022.

(51) Int. Cl.
*A61B 5/00* (2006.01)
*A61B 5/024* (2006.01)

(52) U.S. Cl.
CPC .......... *A61B 5/721* (2013.01); *A61B 5/02416* (2013.01); *A61B 5/02438* (2013.01); *A61B 5/725* (2013.01)

(58) Field of Classification Search
CPC . A61B 5/721; A61B 5/02416; A61B 5/02438; A61B 5/725; A61B 5/7257; A61B 5/1121; A61B 5/14551; A61B 5/7214
See application file for complete search history.

(56) References Cited

U.S. PATENT DOCUMENTS

2017/0164847 A1 6/2017 Pande et al.
2017/0347901 A1 12/2017 Shao et al.
(Continued)

OTHER PUBLICATIONS

Islam et al. "Cascade and parallel combination CPC of adaptive filters for estimating heart rate during intensive physical exercise from photoplethysmographic signal", Jun. 19, 2017, Healthcare Technology Letters., pp. 18-24. (Year: 2017).*
(Continued)

*Primary Examiner* — Kaitlyn E Sebastian
(74) *Attorney, Agent, or Firm* — BLANK ROME LLP

(57) ABSTRACT

The disclosed system improves the physiological estimates (e.g., heart rate, pulse oxygenation, etc.) extracted from photoplethysmography (PPG) signals captured by wearable health monitors (smart watches, fitness trackers, etc.) by employing three sign-data least mean squares (SDLMS) filters in a cascaded parallel combination (CPC) that each successively remove motion artifacts in the x-, y-, and z-dimensions. In some embodiments, a window function eliminates spectral content that is unlikely in view of recent frequency estimates and/or smoothing function smooths the physiological estimates using historical physiological data. The disclosed motion artifact removal system can achieve a level of accuracy using signals from a reflective-type PPG sensor that is typically only achieved via a transmissive-type (e.g., finger-worn) PPG sensor at rest. Specifically, in initial testing, the system was able to estimate the heart rates with less than 2 beats per minute (BPM) of root-mean-squared (RMS) error during periods of both rest and exercise.

17 Claims, 4 Drawing Sheets

(56) References Cited

U.S. PATENT DOCUMENTS

2019/0200889 A1* 7/2019 Stone .................. A61B 5/6823
2019/0357851 A1 11/2019 van Dinther et al.

OTHER PUBLICATIONS

M. T. Islam, S. Tanvir Ahmed, I. Zabir, C. Shahnaz, and S. A. Fattah, "Cascade and parallel combination (cpc) of adaptive filters for estimating heart rate during intensive physical exercise from photoplethysmographic signal," Healthcare Technology Letters, vol. 5, No. 1, pp. 18-24, 2018.

Dixit et al. "LMS Adaptive Filters for Noise Cancellation: a Review." International Journal of Electrical and Computer Engineering. Nov. 4, 2017. [date retrieved: Feb. 6, 2023]. Retrieved from internet: URL: <https://www.researchgate.net/publication/320248881_LMS_Adaptive_Filters_for_Noise_Cancellation_A_Review> entire document.

International Search Report and Written Opinion, mail date Feb. 17, 2023, 31 pages, received in corresponding PCT application No. PCT/US2023/062880.

\* cited by examiner

PARALLEL ADAPTIVE MOTION ARTIFACT REMOVAL

CROSS-REFERENCE TO RELATED APPLICATIONS

This application claims priority to U.S. Prov. Pat. Appl. No. 63/311,726, filed Feb. 18, 2022, which is hereby incorporated by reference in its entirety.

BACKGROUND

Many commercially available wearable health monitoring devices (e.g., smartwatches) use photoplethysmography (PPG) to monitor characteristics of the user's cardiovascular and respiratory systems. PPG is an electro-optic sensing technology. Changes in blood volume and tissue composition are observed by illuminating the skin with a light emitting diode (LED) and measuring the reflected or transmitted light using a photodetector. Features embedded in the received signal can be extracted using signal processing techniques to derive information about a subject, such as heart rate (HR) and blood oxygen saturation ($SpO_2$).

When a subject being monitored is in motion, PPG signal integrity becomes compromised. Distortions in the sampled PPG signal due to motion are known as motion artifacts. The source of motion artifacts can be due to relative changes in the position of the transducer on the skin, which injects noise into the system that decreases PPG signal-to-noise ratio and degrades the accuracy of derived biological information. Furthermore, motion artifacts introduce low frequency content into the system making it problematic to distinguish between the desired underlying biological information and what is derived from the corrupted PPG signal.

Motion artifact removal is the process of reducing the impact of motion artifacts on PPG signals. That can be accomplished using conventional digital signal processing techniques, such as lowpass or bandpass filtering. However, the enhanced performance using those approaches is typically not sufficient to achieve accuracy required to derive biological information for medical devices. Therefore, alternative digital signal processing (DSP) algorithms are employed to attain improved performance. One such class of algorithms is referred to as adaptive filters. An adaptive filter is a digital system with a dynamic transfer function. The transfer function coefficients are updated according to a specified optimization algorithm. The goal of the optimization algorithm is to minimize the error between the adaptive filter's output and a known reference signal for a given input. In motion artifact removal, an accelerometer is usually integrated into the PPG measurement system. The accelerometer serves as the input and the PPG observations are used as the reference.

Two adaptive optimization algorithms are recursive least squares (RLS) and least mean squares (LMS). Islam et al.,[1] which is discussed below with reference to FIG. 3, describes a motion artifact removal algorithm that employs both RLS and LMS adaptive filters in a cascaded parallel combination (CPC) architecture. However, there is a need for more accurate methods for estimating heart rates based on PPG data.

[1] M. T. Islam, S. Tanvir Ahmed, I. Zabir, C. Shahnaz, and S. A. Fattah, "Cascade and parallel combination (cpc) of adaptive filters for estimating heart rate during intensive physical exercise from photoplethysmographic signal," Healthcare Technology Letters, vol. 5, no. 1, pp. 18-24, 2018

SUMMARY

The disclosed system improves the estimates of physiological conditions (e.g., heart rate, pulse oxygenation, etc.) extracted from photoplethysmography (PPG) signals captured by wearable health monitors (smart watches, fitness trackers, etc.) by employing three sign-data least mean squares (SDLMS) filters in a cascaded parallel combination (CPC) that each successively remove motion artifacts in the x-, y-, and z-dimensions. In some embodiments, a window function (e.g., a Fourier transform) eliminates spectral content that is unlikely in view of recent frequency estimates. In some embodiments, the windowed physiological estimates are smoothed by a smoothing function that uses historical physiological data.

As described below, the disclosed motion artifact removal system can achieve a level of accuracy using signals from a reflective-type PPG sensor that is typically only achieved via a transmissive-type (e.g., finger-worn) PPG sensor at rest. Specifically, in initial testing, the disclosed motion artifact removal system was able to estimate the heart rates of a 12-subject dataset with less than 2 beats per minute (BPM) of root-mean-squared (RMS) error during periods of both rest and exercise.

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments.

DETAILED DESCRIPTION

Figure 2:
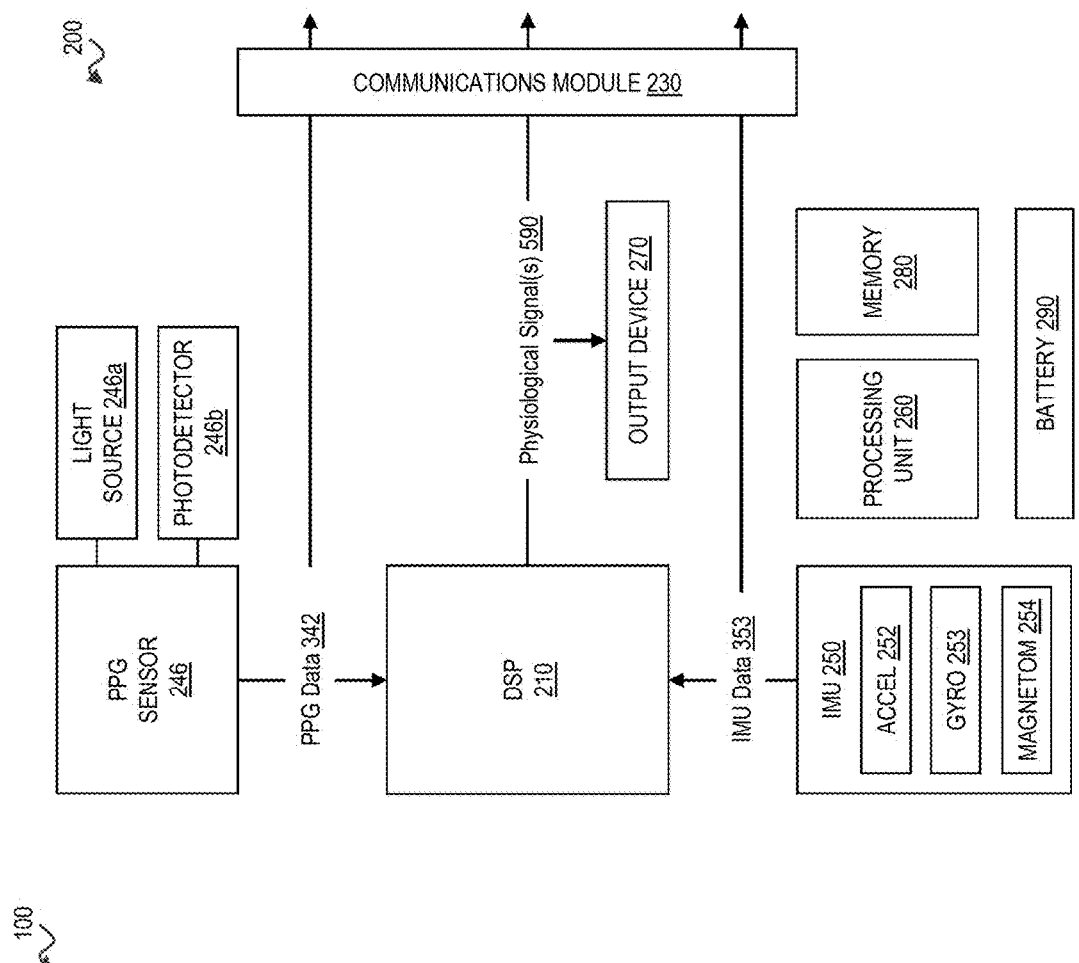
FIG. 2 is a block diagram of a wearable health monitoring device according to exemplary embodiments.

Reference to the drawings illustrating various views of exemplary embodiments is now made. In the drawings and the description of the drawings herein, certain terminology is used for convenience only and is not to be taken as limiting the embodiments of the present invention. Furthermore, in the drawings and the description below, like numerals indicate like elements throughout.

Figure 1:
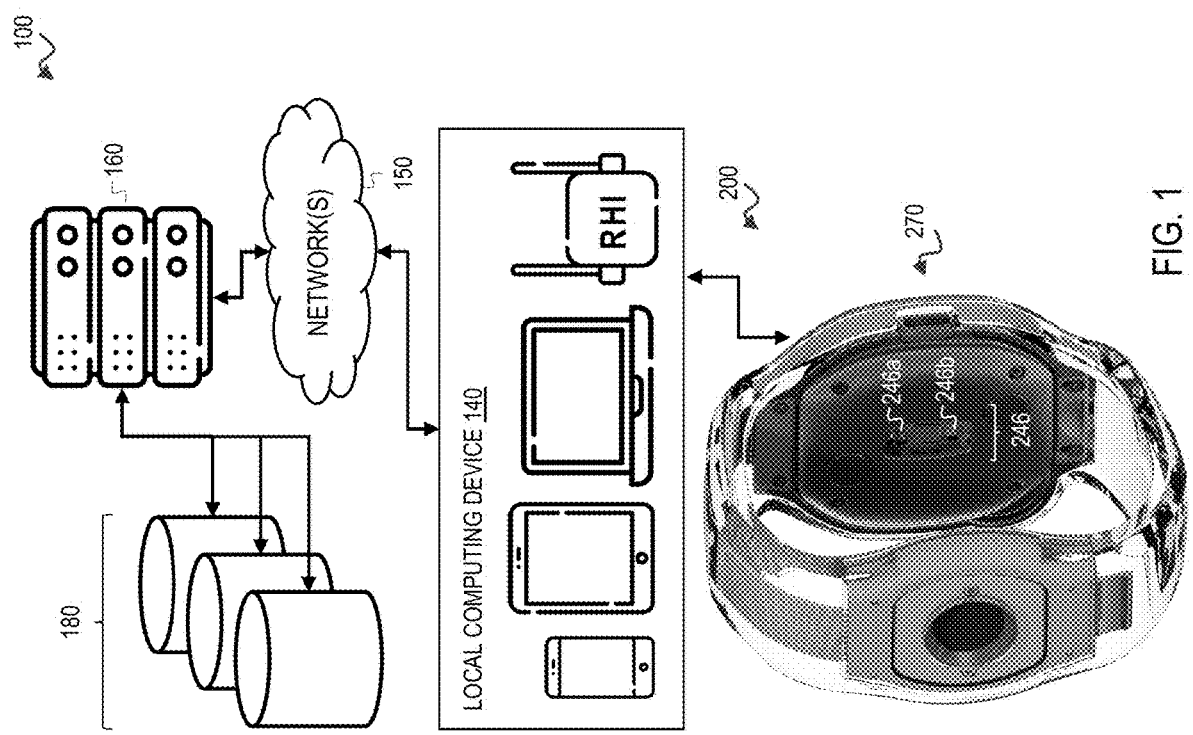
FIG. 1 is a diagram of an architecture used by wearable health monitoring devices according to exemplary embodiments.

FIG. 1 is a diagram of an architecture 100 used by wearable health monitoring devices 200 according to exemplary embodiments.

As shown in FIG. 1, the architecture 100 includes a wearable health monitoring device 200 that communicates with a server 160 via one or more communication networks 150 (e.g., local area networks, cellular networks, the Internet, etc.). The server 160 stores data in non-transitory computer readable storage media 180.

The wearable health monitoring device 200 may be, for example, the modular wristband and sensor system described in co-pending U.S. patent application Ser. No. 17/806,475. The server 160 may include, for example, the AI-enabled health platform described in co-pending U.S. patent application Ser. No. 17/806,477. As described in U.S. patent application Ser. No. 17/806,477, for instance, the computer readable storage media 180 may include a physiological database (stored in any number of hardware storage devices) that stores physiological signals (e.g., heart rate data y(n)) indicative of one or more physiological conditions of a user of the wearable health monitoring device 200 and, in some embodiments, physiological health inferences identified (e.g., by the server 160) based on those physiological signals.

In the embodiment of FIG. 1, for example, the wearable health monitoring device 200 communicates with the server 160 via a local computing device 140, which receives and processes data from the wearable health monitoring device 200 and outputs the processed data to the server 160 via the one or more networks 150. For instance, the wearable health monitoring device 200 may communicate with the local computing devices 140 using a direct, wireless communication (e.g., using Zigbee, Bluetooth, Bluetooth Low Energy, ANT, etc.), via a local area network (e.g., a Wi-Fi network), by transferring data using a wired connection (e.g., a USB cable), or by storing data in a removable storage device (e.g., a USB flash memory device, a microSD card, etc.) that can be removed and inserted into a local computing device 140. In those embodiments, the local computing device 140 may be any hardware computing device having one or more hardware computer processors that perform the functions described herein. For example, a local computing device may be smartphone, a tablet computer, a personal computer (a desktop computer, notebook computer, etc.), a router, a dedicated processing device (installed, for example, in hospitals or other clinical settings) that forms a local access point to wirelessly receive data from the wearable health monitoring device 200, etc.

As described in more detail below with reference to FIG. 2, the wearable health monitoring device 200 includes a photoplethysmography (PPG) sensor 246. The PPG sensor 246 may be any device capable of obtaining (e.g., optically) a plethysmogram that can be used to detect blood volume changes in the microvascular bed of tissue. In the embodiments of FIGS. 1 and 2, for instance, the PPG sensor 246 includes a light source 246a that emits light to illuminate the skin of the user and a photodetector 246b that measures the light emitted by the light source 246a (e.g., as reflected by the skin of the user or residual light after absorption by the tissue). Because changes in the reflected or residual light are indicative of changes in the blood volume and/or tissue composition of the user, features embedded in the signals captured by the PPG sensor 246 can be extracted using signal processing techniques to derive physiological signals indicative of the physiological condition of the user (e.g., the heart rate and/or blood oxygen saturation of the user. In the embodiment of FIGS. 1 and 2, the wearable health monitoring device 200 also includes a display device 270, which may output the physiological signals extracted from the signals captured by the PPG sensor 246.

In the embodiment of FIG. 1, the wearable health monitoring device 200 is realized as a wristband (e.g., smart watch, activity tracker, etc.). In other embodiments, the wearable health monitoring device 200 may be any wearable device that includes a PPG sensor 246 (e.g., a finger ring, a finger clip, an ear clip, etc.).

FIG. 2 is a block diagram of a wearable health monitoring device 200 according to exemplary embodiments.

In the embodiment of FIG. 2, the wearable health monitoring device 200 includes the PPG sensor 246 described above (including the light source 246a and the photodetector 246b), a digital signal processing unit 210, a communications module 230, an inertial measurement unit 250, a hardware computer processing unit 260, output device(s) 270, memory 280, and a battery 290.

The communications module 230 enables the wearable health monitoring device 200 to output data for transmittal to the server 160. The communications module 230 may include, for example, a module for communicating with a local computing device 140—for example, using direct, short range, wireless communication (e.g., Bluetooth, Zigbee, etc.) or via a local area network 150 (e.g., WiFi)—or a module for communicating with the server 160 via the one or more networks 150. The output device 270 may include a display (e.g., as shown in FIG. 1), a speaker, a haptic feedback device, etc. The memory 280 may include any non-transitory computer readable storage media (e.g., a hard drive, flash memory, etc.). The processing unit 260 may include any hardware computing device suitably programmed to perform the functions described herein (e.g., a central processing unit executing instructions stored in the memory 280, a state machine, a field programmable array, etc.). The battery 290 stores power received via a charging port (e.g., a universal serial bus port, an inductive charging port, etc.) and provides power to the components described above.

The PPG sensor 246 outputs PPG data 342 indicative of the light emitted by the light source 246a and captured by the photodetector 246b as described above. Meanwhile, as briefly mentioned above and described in detail below, the digital signal processing module 210 performs digital signal processing on the PPG data 342 to extract features embedded in the PPG data 342 and derive physiological signals 460 indicative of physiological conditions of the user, such as heart rate (HR) and blood oxygen saturation ($SpO_2$). Because motion of the user degrades the accuracy of the derived physiological signals 460 by introducing motion artifacts into the PPG data 342, the digital signal processing module 210 performs motion artifact removal to reduce the impact of those motion artifacts on the PPG data 342.

To enable the removal of motion artifacts from the PPG data 342, the wearable health monitoring device 200 of FIG. 2 includes an inertial measurement unit 250 that outputs IMU data 353 indicative of the movement of the wearable health monitoring device 200. The inertial measurement unit 250 may be any device capable of measuring and reporting the specific force and angular rate of the wearable health monitoring device 200. The inertial measurement unit 250 may also measure and report the orientation of the wearable health monitoring device 200. In the embodiment of FIG. 2, the inertial measurement unit 250 includes an accelerometer 252 (e.g., a 3-axis accelerometer), a gyroscope 253, and a magnetometer 254.

In the embodiment of FIG. 2, the physiological signals 460 are extracted by the digital signal processing unit 210 of the wearable health monitoring device 200. Additionally or alternatively, however, physiological signals 460 may be extracted by the server 160 and/or a local computing device 140. Accordingly, in those embodiments, the communications module 230 outputs the PPG data 342 and the IMU data 353 for transmittal to the local computing device 140 and/or the server 160.

Motion artifact removal can be accomplished using conventional digital signal processing techniques, such as low-pass or bandpass filtering. However, the enhanced performance using those approaches is typically not sufficient to achieve accuracy specifications of derived biological information for medical devices. Therefore, alternative digital signal processing algorithms are employed to attain improved performance. One such class of algorithms is referred to as adaptive filters, which been successfully implemented in motion artifact removal filtering.

An adaptive filter is a digital system with a dynamic transfer function. The transfer function coefficients are updated according to a specified optimization algorithm. The goal of the optimization algorithm is to minimize the error e(n) between the adaptive filter's output y[n] and a known reference signal d[n] for a given input x[n]. In motion artifact removal, IMU data 353 serves as the input x[n] and PPG data 342 is used as the reference d[n]. Two well-known adaptive optimization algorithms are recursive least squares (RLS) and least mean squares (LMS).

Figure 3:
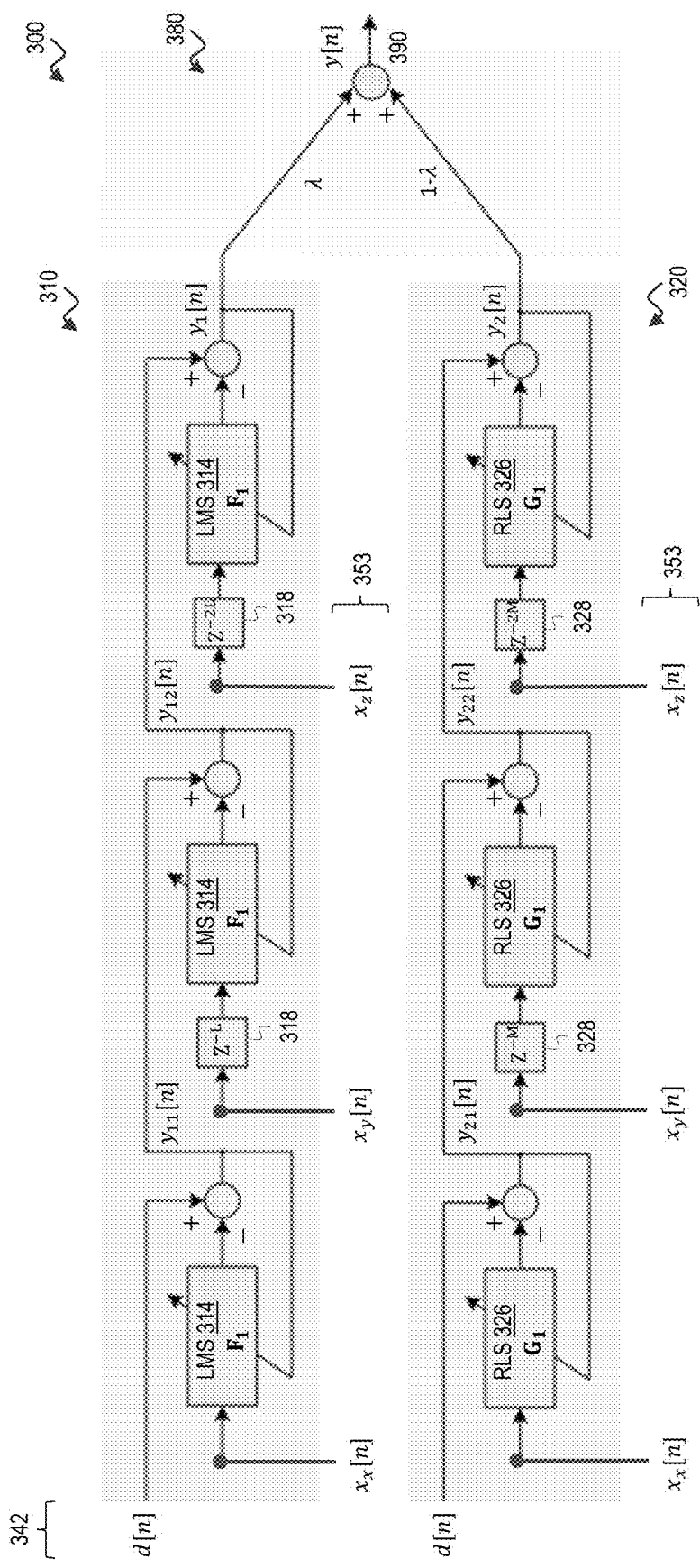
FIG. 3 illustrates a prior art motion artifact removal algorithm.

FIG. 3 is a block diagram of a prior art motion artifact removal algorithm that employs both RLS and LMS adaptive filters in a cascaded parallel combination (CPC) architecture 300 to extract an estimated heart rate 390 from corrupted PPG data 342 using acceleration data 353.

As shown in FIG. 3, the cascaded parallel combination architecture 300 includes two cascaded noise canceler blocks 310 and 320 and a combination layer 380. The second noise cancellation block 320 includes three recursive least squares (RLS) filters 326 in series. The first noise cancellation block 310 includes three least mean squares (LMS) filters 314 in series.

Recursive least squares is a technique used for minimizing a quadratic error function, where the vector of filter coefficients w is updated at each step as new data becomes available. The RLS filter 326 is initialized:

$$w(0)=0 \qquad [\text{Eq. 1}]$$

$$P(0)=\delta I \qquad [\text{Eq. 2}]$$

where P(n) is the covariance matrix, $\delta$ is the initial covariance values, I is the identity matrix of rank M+1, and M is the filter order.

The computation for n=1, 2, . . . , is:

$$x(n) = \begin{bmatrix} x(n) \\ x(n-1) \\ \ldots \\ x(n-M) \end{bmatrix} \qquad [\text{Eq. 3}]$$

where x(n) is the input $$e(n)=d(n)-x^T(n)w(n-1) \qquad [\text{Eq. 4}]$$

$$g(n)=P(n-1)x(n)[\epsilon+x^T(n)P(n-1)x(n)]^{-1} \qquad [\text{Eq. 5}]$$

where g(n) is the filter gain and $\epsilon$ is the forgetting factor $$P(n)=\epsilon^{-1}P(n-1)-g(n)x^T(n)\epsilon^{-1}P(n-1) \qquad [\text{Eq. 6}]$$

$$w(n)=w(n-1)+e(n)g(n) \qquad [\text{Eq. 7}]$$

The output w(n) is the vector of optimized coefficients of the adaptive filter 326.

Least mean squares is a stochastic gradient algorithm in that it iterates each tap weight of the transversal filter in the direction of the instantaneous gradient of the squared error signal with respect to the tap weight in question. The LMS algorithm has various alternative implementations. For example, the LMS filter 314 may be initialized $$w(0)=0 \qquad [\text{Eq. 8}]$$

and the computation for n=0, 1, 2, . . . may be $$x(n) = \begin{bmatrix} x(n) \\ x(n-1) \\ \ldots \\ x(n-L+1) \end{bmatrix} \qquad [\text{Eq. 9}]$$

where L is the filter order $$e(n)=d(n)-w^T(n)x(n) \qquad [\text{Eq. 10}]$$

$$w(n+1)=w(n)+\mu e(n)x(n) \qquad [\text{Eq. 11}]$$

where $\mu$ is the learning rate.

Again, the output w(n) is the vector of optimized coefficients of the adaptive LMS filter 314.

As shown in FIG. 3, each LMS filter 314 and RLS filter 326 uses accelerometer data 353 in one of three dimensions $x_x[n]$, $x_y[n]$, and $x_z[n]$ in a cascaded noise cancellation scheme to successively remove motion artifacts in x, y, and z dimensions. In the first stage of each noise canceler block 310 and 320, the input signal d[n] to the adaptive filter 314 or 326 is the PPG signal 342, and the reference is the x-channel accelerometer signal $x_x[n]$. In each cascaded noise canceler block 310 and 320, the output of the first stage is used as the input signal of the second stage—via a delay element 318 or 328—with the y-channel accelerometer signal $x_y[n]$ being the reference signal. Similarly, for the third stage of each cascaded noise canceler block 310 and 320, the input signal is the output of the second stage via a delay element 318 or 328—and the reference signal is the z-channel accelerometer signal $x_z[n]$. The outputs $y_1[n]$ and $y_2[n]$ of each final stage are the motion artifact-reduced output of each cascaded noise canceler block 310 and 320. The combination layer 380 combines the output of the two cascaded noise canceler blocks 310 and 320 according to a combination or mixing parameter A. For example, the combination or mixing parameter A may be a 0 or a 1 (to output only $y_1[n]$ or $y_2[n]$) or a value between 0 and 1 to weight the contributions of the outputs $y_1[n]$ and $y_2[n]$ provide weighted contribution.

Figure 4:
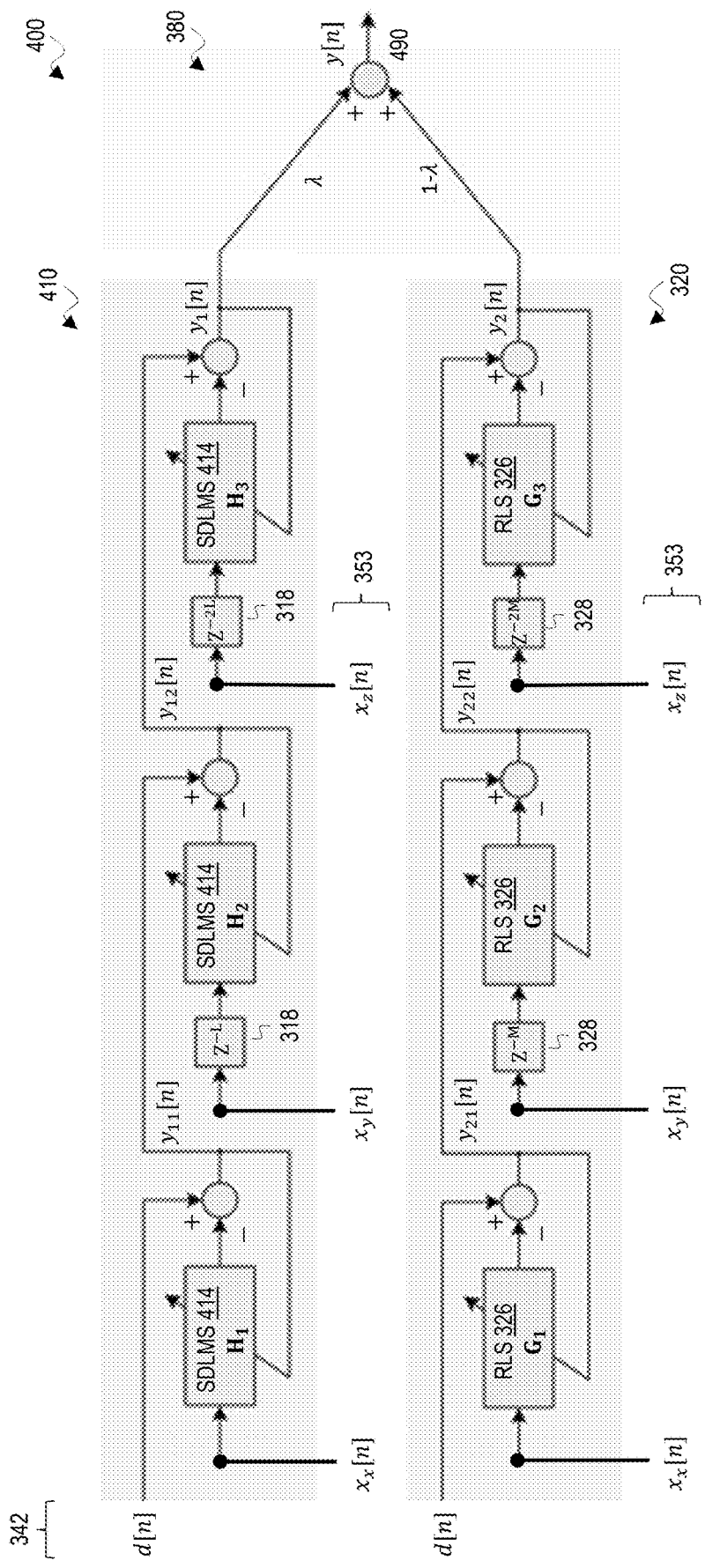
FIG. 4 is a block diagram of a motion artifact removal algorithm using a sign-data least mean squares (SDLMS) cascaded parallel combination (CPC) architecture according to exemplary embodiments of the present invention.

FIG. 4 is a block diagram of a motion artifact removal algorithm using a sign-data LMS (SDLMS) cascaded parallel combination (CPC) architecture 400 according to exemplary embodiments of the present invention.

Similar to the CPC architecture 300 of FIG. 3, the SDLMS CPC architecture 400 includes two cascaded noise canceler blocks 410 and 320 and a combination layer 380. The second noise cancellation block 320 also includes three recursive least squares (RLS) filters 326 in series.

The first noise cancellation block 410, however, includes three sign-data least mean squares (SDLMS) filters 414 in series. The SDLMS filters 414 are similar to the LMS filters 314 described above, but with one important difference. The update stage equation (equation 7 above)

$$w(n+1)=w(n)+\mu e(n)x(n)$$

is replaced by $$w(n+1)=w(n)+\mu e(n)x(n)\cdot\text{sgn}(x(n)) \qquad [\text{Eq. 12}]$$

where the sign of the input data is used to guide the direction of the update. That allows for faster filter convergence with the trade-off that the filter may become unstable if p is not chosen properly. Determining an appropriate value for p is essential for filter convergence. If the learning rate is sufficiently small, the filter 414 will converge to a correct solution, but that may require a significantly long training sequence which would make the filter 414 impractical for real-time applications. If the learning rate is large, the filter 414 can converge to the correct solution within a relatively short time interval, but the granularity needed to achieve the optimal solution of w may not be realized. The other concern with large values of p is that the filter 414 can often diverge from the desired solution. In that scenario, the filter coefficients become unstable and the LMS-type algorithms are unable to recover from the incorrect state. Trade-offs must be made between convergence rate and requisite coefficient resolution. Optimizing p is application specific and can be accomplished through tentation.

Like the CPC architecture 300 of FIG. 3, each SDLMS filter 414 and RLS filter 326 uses accelerometer data 353 in one of three dimensions $x_x[n]$, $x_y[n]$, and $x_z[n]$ in a cascaded noise cancellation scheme to successively remove motion artifacts in x, y, and z dimensions. In the first stage of each noise canceler block 410 and 320, the input signal d[n] to the adaptive filter 414 or 326 is the PPG signal 342, and the reference is the x-channel accelerometer signal $x_x[n]$. In each cascaded noise canceler block 410 and 320, the output of the first stage is used as the input signal—via a delay element 318 or 328—of the adaptive filter 414 or 326 of the second stage with the y-channel accelerometer signal $x_y[n]$ being the reference signal. Similarly, for the third stage of each cascaded noise canceler block 410 and 420, the input signal of the adaptive filter 414 or 326 is the output of the second stage—via a delay element 318 or 328—and the reference signal is the z-channel accelerometer signal $x_z[n]$. The outputs $y_1[n]$ and $y_2[n]$ of each final stage are the motion artefact-reduced output of each cascaded noise canceler block 410 and 320. The combination layer 380 combines the output of the two cascaded noise canceler blocks 410 and 320 according to a combination or mixing parameter A. For example, the combination or mixing parameter λ may be a 0 or a 1 (to output only $y_1[n]$ or $y_2[n]$) or a value between 0 and 1 to weight the contributions of the outputs $y_1[n]$ and $y_2[n]$ provide weighted contribution.

The SDLMS CPC architecture 400 extracts estimated physiological data 490 (e.g., the estimated heart rate or pulse oxygenation of the user) from corrupted PPG data 342 using acceleration data 353.

Figure 5:
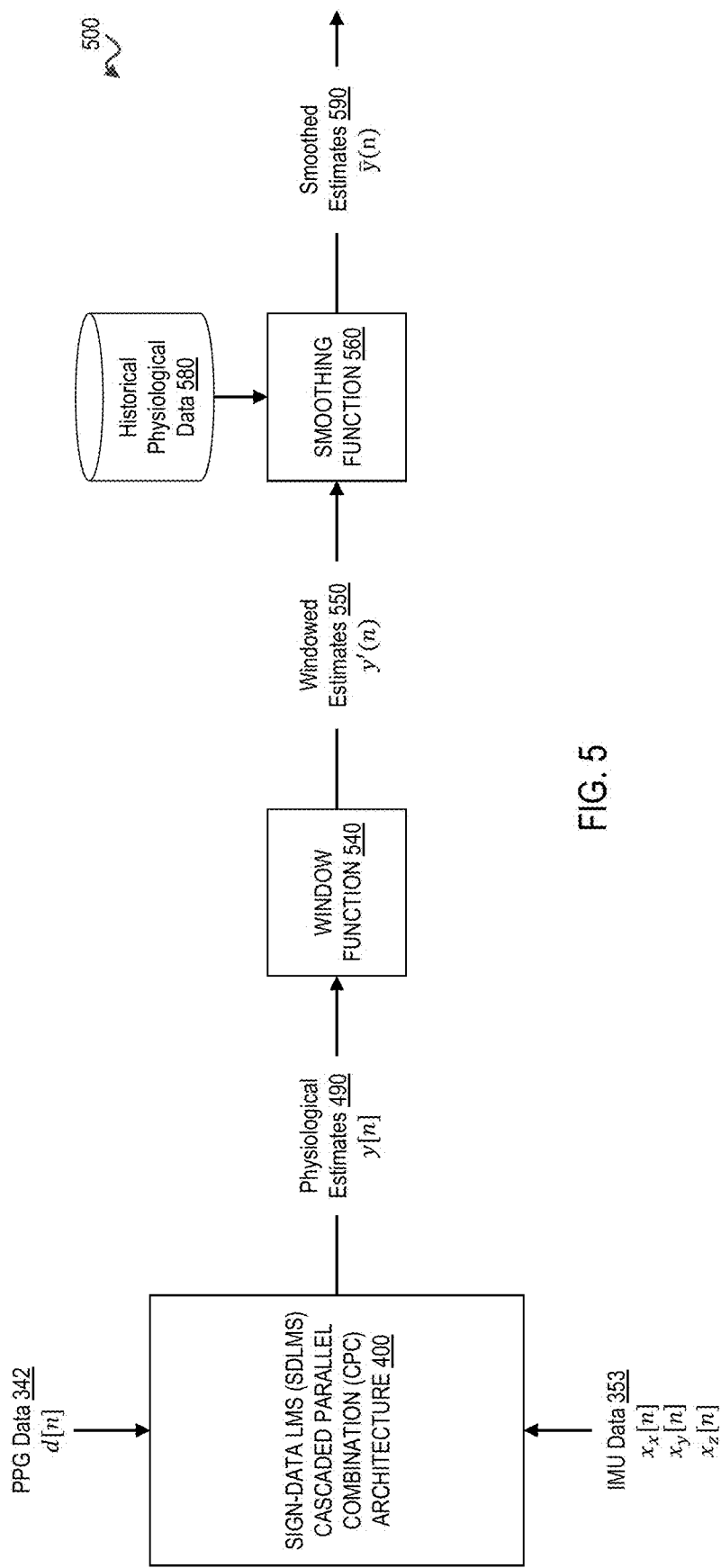
FIG. 5 is a block diagram of a motion artifact removal system according to an exemplary embodiment.

FIG. 5 is a block diagram of a motion artifact removal system 500 according to an exemplary embodiment.

As shown in FIG. 5, the physiological estimates 490 are output by the SDLMS CPC architecture 400 of FIG. 4 to a window function 540 that eliminates unlikely spectral content and outputs windowed estimates 550. For example, a Fourier transform may be applied to the time domain output of the filter SDLMS CPC architecture 400. The window function 540 eliminates spectral content that is unlikely in view of recent frequency estimates. For instance, if the physiological estimates 490 had a peak frequency of 1 Hz in the previous estimate, it is highly unlikely that after 2 seconds the next estimate would be 2 Hz. The window function 540 is centered around a middle value (e.g., an average frequency of the physiological estimates 490 over a previous time period) and is zero-valued outside of a predetermined threshold from the middle value (or goes sufficiently rapidly toward zero). The threshold around the middle value may be a tunable parameter based on the use case.

The window function 540 may be a non-negative, smooth, "bell-shaped" curve that tapers away from the middle value. Alternatively, the window function 540 may be a rectangle, triangle, or other function. When the physiological estimates 490 are "multiplied" by the window function 540, the product is also zero-valued outside of the thresholds; in other words, the windowed estimates 550 are the physiological estimates 490 that overlap with the window function (the "view through the window"). Equivalently, the physiological estimates 490 within the window function 540 may first be isolated and those isolated physiological estimates 490 (within the window function 540) may be multiplied by the window function 540.

The windowed physiological estimates 550, which are smoothed by a smoothing function 560 using historical physiological data 580. The smoothing function 560 may be, for example, a moving average filter of the last N estimates. The number of estimates N may also be a tunable parameter based on the use case.

As shown below, the disclosed motion artifact removal system 500 can achieve a level of accuracy using signals from a reflective-type PPG sensor 246 that is typically only achieved via a transmissive-type (e.g., finger-worn) PPG sensor at rest. Specifically, in initial testing, the disclosed motion artifact removal system 500 was able to estimate the heart rates of a 12-subject dataset with less than 2 beats per minute (BPM) of root-mean-squared (RMS) error during periods of both rest and exercise.

The disclosed motion artifact removal system 500 was applied to each of the 12 acquired subject datasets. Heart rate estimates 590 generated by the disclosed system 500 were compared to heart rate datasets derived from the chest strap electrocardiogram signals, which were also part of the dataset. Table 1 shows the RMS error over the entire 5-minute experiment, during each of two resting periods, and during 4 minutes of jogging between the two resting periods.

TABLE 1

| | Root-Mean-Squared Error | | |
|---|---|---|---|
| Participant | Overall | Resting | Jogging |
| 1 | 2.7 | 1.8 | 2.8 |
| 2 | 1.1 | 1.8 | 0.8 |
| 3 | 1.1 | 1.1 | 1.0 |
| 4 | 1.6 | 3.3 | 0.6 |
| 5 | 1.2 | 0.9 | 1.2 |
| 6 | 1.8 | 3.5 | 1.0 |
| 7 | 1.3 | 1.5 | 1.3 |
| 8 | 0.6 | 0.9 | 0.6 |
| 9 | 0.7 | 0.8 | 0.7 |
| 10 | 4.3 | 1.8 | 4.7 |
| 11 | 2.1 | 1.3 | 2.3 |
| 12 | 1.0 | 1.0 | 1.1 |

Table 2 summarizes the standard deviations over the entire 5-minute experiment, during each of two resting periods, and during 4 minutes of jogging between the two resting periods:

TABLE 2

| | Standard Deviation | | |
|---|---|---|---|
| Participant | Overall | Resting | Jogging |
| 1 | 2.5 | 1.8 | 2.6 |
| 2 | 1.1 | 1.9 | 0.8 |
| 3 | 1.1 | 1.1 | 1.0 |
| 4 | 1.5 | 2.9 | 0.5 |
| 5 | 1.1 | 0.8 | 1.2 |
| 6 | 1.8 | 3.6 | 1.0 |
| 7 | 1.3 | 1.4 | 1.3 |
| 8 | 0.6 | 0.8 | 0.5 |
| 9 | 0.7 | 0.8 | 0.7 |

TABLE 2-continued

| Participant | Standard Deviation | | |
| --- | --- | --- | --- |
| | Overall | Resting | Jogging |
| 10 | 4.2 | 1.6 | 4.7 |
| 11 | 1.9 | 1.2 | 2.0 |
| 12 | 0.9 | 0.9 | 0.9 |

Table 3 summarizes the maximum errors observed for each participant over the entire 5-minute experiment, during each of two resting periods, and during 4 minutes of jogging between the two resting periods:

TABLE 3

| Participant | Peak Error | | |
| --- | --- | --- | --- |
| | Overall | Resting | Jogging |
| 1 | 8.7 | 4.8 | 8.7 |
| 2 | 6.2 | 6.2 | 4.0 |
| 3 | 5.9 | 2.8 | 5.9 |
| 4 | 9.9 | 9.9 | 2.6 |
| 5 | 6.8 | 2.5 | 6.8 |
| 6 | 8.2 | 8.2 | 7.8 |
| 7 | 4.5 | 3.8 | 4.5 |
| 8 | 2.3 | 2.3 | 1.5 |
| 9 | 3.1 | 2.5 | 3.1 |
| 10 | 14.8 | 4.7 | 14.8 |
| 11 | 9.6 | 3.1 | 9.6 |
| 12 | 4.6 | 2.1 | 4.6 |

While preferred embodiments have been described above, those skilled in the art who have reviewed the present disclosure will readily appreciate that other embodiments can be realized within the scope of the invention. Accordingly, the present invention should be construed as limited only by any appended claims.

What is claimed is:

1. A cascaded parallel combination (CPC) architecture for removing motion artifacts, the CPC architecture comprising:
a first cascaded noise cancellation block configured to generate a first cascaded noise cancellation block output, the first cascaded noise cancellation block comprising:
a first sign-data least mean squares (SDLMS) filter configured to receive photoplethysmography (PPG) data and minimize error between a first SDLMS suboutput and acceleration data in a first dimension;
a second SDLMS filter configured to receive the first SDLMS suboutput and minimize error between a second SDLMS suboutput and acceleration data in a second dimension; and
a third SDLMS filter configured to receive the second SDLMS suboutput and minimize error between the first cascaded noise cancellation block output and acceleration data in a third dimension;
a second cascaded noise cancellation block configured to generate a second cascaded noise cancellation block output, the second cascaded noise cancellation block comprising:
a first recursive least squares (RLS) filter configured to receive the PPG data and minimize error between a first RLS suboutput and the acceleration data in the first dimension;
a second RLS filter configured to receive the first RLS suboutput and minimize error between a second RLS suboutput and the acceleration data in the second dimension; and
a third RLS filter configured to receive the second RLS suboutput and minimize error between the second cascaded noise cancellation block output and the acceleration data in the third dimension; and
a combination layer configured to estimate physiological data by combining the first cascaded noise cancellation block output and the second cascaded noise cancellation block output according to a combination or mixing parameter,
wherein each SDLMS filter is an adaptive filter configured to calculate a vector w(n) of optimized coefficients according to $$x(n) = \begin{bmatrix} x(n) \\ x(n-1) \\ \ldots \\ x(n-L+1) \end{bmatrix}$$

$$e(n) = d(n) - w^T(n)x(n)$$

$$w(n+1) = w(n) + \mu e(n)x(n) \cdot \text{sgn}(x(n))$$

where n is a sample index, x(n) is the acceleration data, L is a filter order, d(n) is the PPG data, μ is a learning rate, sgn(x(n)) is the sign of the acceleration data.

2. The CPC architecture of claim 1, further comprising:
a window function configured to receive the estimated physiological data and generate windowed physiological data.

3. The CPC architecture of claim 2, wherein the window function is a mathematical function that is zero-valued outside of a predetermined threshold around an estimated frequency of the estimated physiological data.

4. The CPC architecture of claim 2, further comprising:
a smoothing function configured to receive the windowed physiological data and generate smoothed physiological data.

5. The CPC architecture of claim 4, wherein the smoothing function comprises a moving average filter of the N most recent estimates in the windowed physiological data.

6. The CPC architecture of claim 1, wherein:
the PPG data is captured by a wearable PPG sensor; and
the acceleration data is indicative of the acceleration of the wearable PPG sensor.

7. A cascaded parallel combination (CPC) architecture for removing motion artifacts, the CPC architecture comprising:
a first cascaded noise cancellation block configured to generate a first suboutput, the first cascaded noise cancellation block comprising three sign-data least mean squares (SDLMS) filters in a cascaded noise cancellation scheme, each of the three SDLMS filters configured to receive acceleration data in one of three dimensions, the three SDLMS filters configured to successively remove motion artifacts in each of the three dimensions from photoplethysmography (PPG) data;
a second cascaded noise cancellation block configured to generate a second suboutput, the second cascaded noise cancellation block comprising three sign-data least mean squares RLS filters in a cascaded noise cancellation scheme, each of the three RLS filters configured to receive acceleration data in one of three dimensions, the three RLS filters configured to successively remove motion artifacts in each of the three dimensions from the PPG data; and a combination layer configured to combine the first suboutput and the second suboutput according to a combination or mixing parameter, wherein each SDLMS filter is an adaptive filter configured to calculate a vector w(n) of optimized coefficients according to $$x(n) = \begin{bmatrix} x(n) \\ x(n-1) \\ \ldots \\ x(n-L+1) \end{bmatrix}$$

$$e(n)=d(n)-w^T(n)x(n)$$

$$w(n+1)=w(n)+\mu e(n)x(n)\cdot\text{sgn}(x(n))$$

where n is a sample index, x(n) is the acceleration data, L is a filter order, d(n) is the PPG data, μ is a learning rate, sgn(x(n)) is the sign of the acceleration data.

8. The CPC architecture of claim 7, further comprising:
a window function configured to receive the estimated physiological data and generate windowed physiological data.

9. The CPC architecture of claim 8, wherein the window function is a mathematical function that is zero-valued outside of a predetermined threshold around an estimated frequency of the estimated physiological data.

10. The CPC architecture of claim 8, further comprising:
a smoothing function configured to receive the windowed physiological data and generate smoothed physiological data.

11. The CPC architecture of claim 10, wherein the smoothing function comprises a moving average filter of the N most recent estimates in the windowed physiological data.

12. The CPC architecture of claim 7, wherein:
the PPG data is captured by a wearable PPG sensor; and
the acceleration data is indicative of the acceleration of the wearable PPG sensor.

13. A method for removing motion artifacts from photoplethysmography (PPG) data captured by a wearable PPG sensor using acceleration data indicative of the acceleration of the wearable PPG sensor in each of three dimensions, the method comprising:
receiving the PPG data, by a first sign-data least mean squares (SDLMS) filter of a first cascaded noise cancellation block;
generating a first SDLMS suboutput, by the first SDLMS filter, by minimizing error between the first SDLMS suboutput and the acceleration data in the first dimension;
receiving the first SDLMS suboutput, by a second SDLMS filter of the first cascaded noise cancellation block;
generating a second SDLMS suboutput, by the second SDLMS filter, by minimizing error between the second SDLMS suboutput and the acceleration data in the second dimension;
receiving the second SDLMS suboutput, by a third SDLMS filter of the first cascaded noise cancellation block;
generating a first noise cancellation block output, by the third SDLMS filter, by minimizing error between the first noise cancellation block output and the acceleration data in the third dimension;
receiving the PPG data, by a first recursive least squares (RLS) filter of a second cascaded noise cancellation block;
generating a first RLS suboutput, by the first RLS filter, by minimizing error between the first RLS suboutput and the acceleration data in the first dimension;
receiving the first RLS suboutput, by a second RLS filter of the first cascaded noise cancellation block;
generating a second RLS suboutput, by the second RLS filter, by minimizing error between the second RLS suboutput and the acceleration data in the second dimension;
receiving the second RLS suboutput, by a third RLS filter of the first cascaded noise cancellation block;
generating a second noise cancellation block output, by the third RLS filter, by minimizing error between the second noise cancellation block output and the acceleration data in the third dimension; and
estimating physiological data by combining the first cascaded noise cancellation block output and the second cascaded noise cancellation block output according to a combination or mixing parameter,
wherein each SDLMS filter is an adaptive filter configured to calculate a vector w(n) of optimized coefficients according to $$x(n) = \begin{bmatrix} x(n) \\ x(n-1) \\ \ldots \\ x(n-L+1) \end{bmatrix}$$

$$e(n)=d(n)-w^T(n)x(n)$$

$$w(n+1)=w(n)+\mu e(n)x(n)\cdot\text{sgn}(x(n))$$

where n is a sample index, x(n) is the acceleration data, L is a filter order, d(n) is the PPG data, μ is a learning rate, sgn(x(n)) is the sign of the acceleration data.

14. The method of claim 13, further comprising:
generating windowed physiological data by applying a window function to the estimated physiological data.

15. The method of claim 14, wherein the window function is a mathematical function that is zero-valued outside of a predetermined threshold around an estimated frequency of the estimated physiological data.

16. The method of claim 14, wherein further comprising:
generating smoothed physiological data by applying a smoothing function to the windowed physiological data.

17. The method of claim 16, wherein the smoothing function comprises a moving average filter of the N most recent estimates in the windowed physiological data.

* * * * *